United States Patent
Miu et al.

(10) Patent No.: US 10,566,112 B2
(45) Date of Patent: Feb. 18, 2020

(54) MINIATURE PHOTOELECTRIC COMPOSITE CABLE FOR HIGH-DEFINITION VIDEO SIGNAL TRANSMISSION AND METHOD OF MAKING SAME

(71) Applicant: JIANGSU ZHONGTIAN TECHNOLOGY CO., LTD., Nantong (CN)

(72) Inventors: Wei-Wei Miu, Nantong (CN); Hua Zhou, Nantong (CN); Xiao-Jian Chen, Nantong (CN)

(73) Assignee: JIANGSU ZHONGTIAN TECHNOLOGY CO., LTD., Nantong (CN)

( * ) Notice: Subject to any disclaimer, the term of this patent is extended or adjusted under 35 U.S.C. 154(b) by 0 days.

(21) Appl. No.: 16/174,218

(22) Filed: Oct. 29, 2018

(65) Prior Publication Data

US 2019/0066876 A1  Feb. 28, 2019

Related U.S. Application Data

(63) Continuation-in-part of application No. PCT/CN2016/113712, filed on Dec. 30, 2016.

(30) Foreign Application Priority Data

May 6, 2016 (CN) .......................... 2016 1 0296541

(51) Int. Cl.
*H01B 11/22* (2006.01)
*H01B 13/24* (2006.01)
(Continued)

(52) U.S. Cl.
CPC .......... *H01B 11/22* (2013.01); *G02B 6/4403* (2013.01); *G02B 6/4416* (2013.01);
(Continued)

(58) Field of Classification Search
CPC .. H01B 11/22; H01B 7/1875; H01B 13/0207; H01B 13/228; H01B 13/24; H01B 13/26;
(Continued)

(56) References Cited

U.S. PATENT DOCUMENTS

| 6,757,465 B1 * | 6/2004 | Yokokawa | ........... G02B 6/4405 385/113 |
| 9,052,486 B2 * | 6/2015 | Messer | ................ G02B 6/4432 |

(Continued)

FOREIGN PATENT DOCUMENTS

| CN | 101923198 A | 12/2010 |
| CN | 102254610 A | 11/2011 |

(Continued)

*Primary Examiner* — Timothy J Thompson
*Assistant Examiner* — Michael F McAllister
(74) *Attorney, Agent, or Firm* — ScienBiziP, P.C.

(57) ABSTRACT

A miniature photoelectric composite cable for high-definition video signal transmission includes a flat optical fiber component and a round electrical component. The flat optical fiber component includes a multi-core optical fiber, a strengthening layer, and a light jacket. The round electrical component includes a multi-core electrical cable, a cladding, and an electric jacket. The cladding covers outside the multi-core electrical cable. The optical fiber component and the electrical component are arranged side-by-side.

11 Claims, 1 Drawing Sheet

(51) Int. Cl.
  *H01B 13/26* (2006.01)
  *G02B 6/44* (2006.01)
  *H01B 7/18* (2006.01)
  *H01B 13/02* (2006.01)
  *H01B 13/22* (2006.01)
  *H01B 7/08* (2006.01)

(52) U.S. Cl.
  CPC ......... *G02B 6/4432* (2013.01); *G02B 6/4486* (2013.01); *H01B 7/1875* (2013.01); *H01B 13/0207* (2013.01); *H01B 13/228* (2013.01); *H01B 13/24* (2013.01); *H01B 13/26* (2013.01); *H01B 7/0892* (2013.01)

(58) Field of Classification Search
  CPC ... H01B 7/0892; G02B 6/4432; G02B 6/4486
  USPC ....................................................... 174/70 R
  See application file for complete search history.

(56) References Cited

U.S. PATENT DOCUMENTS

| | | | |
|---|---|---|---|
| 9,477,057 B2 * | 10/2016 | Bringuier | G02B 6/02357 |
| 2005/0013573 A1 * | 1/2005 | Lochkovic | G02B 6/4402 |
| | | | 385/128 |
| 2013/0287349 A1 * | 10/2013 | Faulkner | H01B 11/22 |
| | | | 385/101 |

FOREIGN PATENT DOCUMENTS

| | | |
|---|---|---|
| CN | 102364608 A | 2/2012 |
| CN | 202563964 U | 11/2012 |
| CN | 103456411 A | 12/2013 |
| CN | 203415300 U | 1/2014 |
| CN | 203503370 U | 3/2014 |
| CN | 104658678 A | 5/2015 |
| CN | 105869769 A | 8/2016 |

* cited by examiner

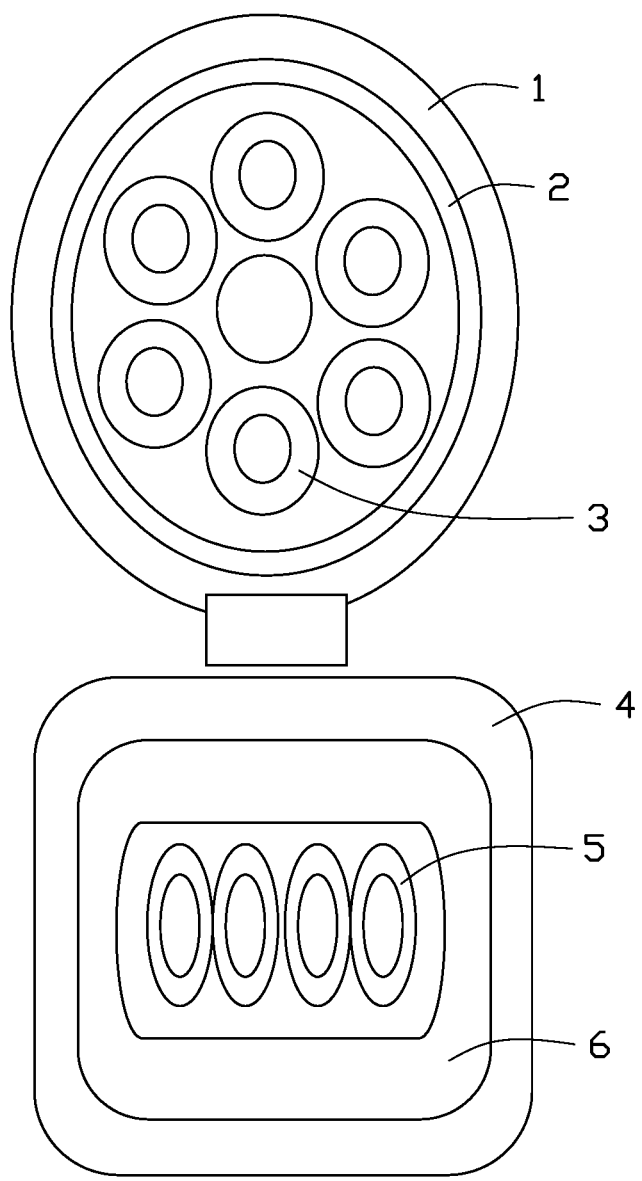

MINIATURE PHOTOELECTRIC COMPOSITE CABLE FOR HIGH-DEFINITION VIDEO SIGNAL TRANSMISSION AND METHOD OF MAKING SAME

FIELD

The subject matter herein generally relates to a photoelectric composite cable for high-definition video signal transmission for connecting between a high-definition television and a miniature device.

BACKGROUND

Following the introduction of smart home devices, some existing television functions fail to meet specialized user requirements. There high expectations for improved television functions expressed by users to televisions manufacturers. Besides watching the televisions, the users further require televisions to be able to realize human-machine interaction, like with a smart mobile phone, so that users can install or delete applications, games, or third party programs according to user preferences, and can utilize network cables or a wireless network to realize services for network searching, IP television, video on demand, digital music, online news, online video chats, and the like.

The currently available television transmission cables are ordinary audio/video cables, which have slow transmission speeds and short transmission ranges and are inadequate to meet the requirements of smart televisions. It is considered that currently, technology for directly using optical fibers for video signals is not advanced. Thus, photoelectric composite cables that convert electrical transmission into light transmission have wide market potential.

Thus there is a room for improvements in the art.

Contents of the Present Disclosure

One aspect of the present disclosure provides a miniature photoelectric composite cable which uses a photoelectric conversion module to realize photoelectric signal conversion to enhance signal transmission speed.

Another aspect of the present disclosure provides a method of making the miniature photoelectric composite cable. The method can observably enhance mechanical properties and photoelectric transmission properties of the photoelectric composite cable.

The technical proposal of the present disclosure is a miniature photoelectric composite cable for high-definition video signal transmission, including a flat fiber optic component and a round electrical component, the fiber optic component and the electrical component arranged side-by-side, the fiber optic component including a multi-core optical fiber, a strengthening layer, and a light jacket, the electrical component including a multi-core electrical cable, a cladding, and an electric jacket, the cladding covered around the multi-core electrical cable.

Specifically, the optical fiber has four cores, and the electrical cable has six cores. The six cores of the electrical cable are twisted together.

Specifically, the strengthening layer is made of high-modular aramid fiber.

Specifically, the light jacket and the electrical jacket are an integrally formed structure.

A miniature photoelectric composite cable for high-definition video signal transmission includes a fiber optic component and an electrical component. A cross-section of the fiber optic component and a cross-section of the electrical component are different.

Specifically, the fiber optic component includes an optical fiber and a light jacket. The electrical component includes an electrical cable and an electric jacket. The light jacket and the electrical jacket are an integrally formed structure.

Specifically, the fiber optic component is rectangular cuboid, the electrical component is round, the outer jacket includes a ringed frame having an upper round portion and a lower rectangular portion.

Specifically, the light jacket and the electric jacket form a connecting portion therebetween. The connecting portion is rectangular. A length of the connecting portion is less than a diameter of the electric jacket and a length of the light jacket.

Specifically, the fiber optic component includes a strengthening layer. The strengthening layer is made of high-polymer aramid fiber.

Specifically, the fiber optic component includes at least three optical fibers. The at least three optical fibers are arranged in straight lines.

Specifically, an outer diameter of the outer jacket is 4.8±0.3 mm.

A method of making a miniature photoelectric composite cable for high-definition video signal transmission includes:
(a) making an electrical component
adjusting tension of a twisting machine to 1.5-2N, placing electrical cables on the twisting machine, pulling from a guide wheel to a machine head;
adjusting a twisting pitch and wrapping a cladding with a tension set to 1-3N, a diameter of wrapping set to 1.8-2.0 mm;
(b) making a fiber optic component
providing a multi-core optical fiber rack;
adjusting a tension of each optical fiber rack to 0.8-1N, the tension of each optical fiber rack kept the same;
molding with a die for extrusion;
(c) making a strengthening layer
selecting high-modular aramid fiber and adjusting tension of an aramid fiber rack to 1-1.5N with a twisting pitch of 450-500 mm;
(d) making an outer jacket
setting an extrusion temperature to 135-168 degrees C.;
adjusting an extrusion speed of a mold to 25-30, adjusting an outer diameter, extruding the outer jacket around the fiber optic component and the electrical component, cooling in a hot water tank and a cold water tank, a temperature of the hot water tank set to 45-60 degrees C., a temperature of the cold water tank set to 19-25 degrees C., and pulling onto the plate to form the miniature photoelectric composite cable for high-definition video signal transmission.

A method of making a miniature photoelectric composite cable for high-definition video signal transmission includes:
(a) making an electrical component
placing electrical cables on a twisting machine, pulling from a guide wheel to a machine head;
adjusting a twisting pitch and wrapping a cladding;
(b) making a fiber optic component
placing electrical cables on an optical fiber rack and molding with a die for extrusion;
(c) making a strengthening layer
selecting high-modular aramid fiber and making the strengthening layer with an aramid fiber rack;
(d) making an outer jacket arranging the electrical component with the cladding and the fiber optic component with the strengthening layer side-by-side;

extruding the outer jacket around the fiber optic component and the electrical component, cooling in a hot water tank and a cold water tank, and pulling onto the plate to form the miniature photoelectric composite cable for high-definition video signal transmission, the outer jacket including a light jacket and an electric jacket, and a cross-section of the light jacket is different from a cross-section of the electrical jacket.

Specifically, when the electrical component is being made, tension of the twisting machine is set to 1.5-2N, tension of wrapping the cladding is set to 1-3N, and a diameter of the cladding is 1.8-2.0 mm.

Specifically, tension of the fiber optic machine for placing the optical fibers is 0.8-1N.

Specifically, when the fiber optic component includes at least two optical fibers, tension of each optical fiber is the same.

Specifically, tension of the aramid fiber rack is set to 1-1.5N, and a twisting pitch is 450-500 mm.

Specifically, an extrusion temperature is 135-168 degrees C., an extrusion speed is 25-30 r/min, a temperature of the hot water tank is 45-60 degrees C., and a temperature of the cold water tank set to 19-25 degrees C.

Specifically, a total outer diameter of the outer jacket is 4.8±0.3 mm.

The advantages of the present embodiment are: using a flat and round composite design and using a six-core insulating electrical cable and a four-core optical fiber ribbon to cause the product of the present disclosure to have a small size, have exceptional bendability to satisfy 10,000 bending tests, and achieve the highest CMP certification of UL. The composite photoelectric structure uses a photoelectric conversion module to realize photoelectric conversion, thereby enhancing video signal transmission distance and transmission speed.

BRIEF DESCRIPTION OF THE DRAWINGS

Implementations of the present disclosure will now be described, by way of example only, with reference to the attached figures.

FIG. 1 is a diagram of a miniature photoelectric composite cable for high-definition video signal transmission in accordance with an embodiment of the present disclosure.

MAIN COMPONENTS AND REFERENCE NUMBERS

| Electric jacket | 1 |
| Cladding | 2 |
| Cable | 3 |
| Light jacket | 4 |
| Optical fiber | 5 |
| Strengthening layer | 6 |

DETAILED DESCRIPTION

FIG. 1 shows a miniature photoelectric composite cable for high-definition video signal transmission includes a flat fiber optic component and a round electrical component. The fiber optic component and the electrical component are arranged side-by-side. The fiber optic component includes an optical fiber 5 made of a four-core optical fiber ribbon, a strengthening layer 6, and a light jacket 4. The electrical component includes a six-core electrical cable 3, a cladding 2, and an electric jacket 1. The cladding 2 covers around the electrical cable 3. The light jacket 4 and the electric jacket 1 are integrally formed to form an outer jacket.

The fiber optic component and the electrical component have different cross-sectional shapes. Correspondingly, the light jacket 4 and the electric jacket 1 have different cross-sectional shapes to cause the outer jacket to have a ringed frame having a round portion and a rectangular portion. The light jacket 4 and the electric jacket 1 are connected by a connecting portion therebetween. The connecting portion is rectangular. A length of the connecting portion is less than a diameter of the electrical jacket and a length of the light jacket.

Person having ordinary skill in the art can understand that the fiber optic component is not limited to a four-core optical fiber, and according to different transmission signals, the quantity of optical fibers of the fiber optic component may be different, for example, single-core, three-core, 5-core, or other core quantities may be used. The quantity of the electrical cables is not limited to a six-core electrical cable. The quantity of electrical cables of the electrical component can be other quantities, for example, single-core, double-core, three-core, or other core quantities may be used.

Detailed Method of Manufacture (a) making an electrical component adjusting and testing tension of a six-core twisting machine, setting the tension of the twisting machine to 1.5-2N, arranging six plates of 0.6±0.05 mm diameter cables according to color, mounting on the twisting machine, pulling from a guide wheel to a machine head;

adjusting a twisting pitch, the twisting pitch set to 350,450 mm; and wrapping an aluminum cladding having a standard of 8 mm with a wrapping tension set to 1-3N, a diameter of wrapping set to 1.8-2.0 mm;

(b) making a fiber optic component providing a four-core optical fiber rack and adjusting a tension of each optical fiber rack to 0.8-1N, the tension of each optical fiber rack kept the same;

molding with a die for extrusion, an outer diameter of the four-core optical fiber set to 1.0-0.35 mm;

(c) making a strengthening layer selecting a high-modular aramid fiber and adjusting tension of an aramid fiber rack to 1-1.5N with a twisting pitch of 450-500 mm.

(d) making an outer jacket selecting high-functional jacket material good enough to satisfy the highest CMP certification of UL. First, a total outer diameter of the outer jacket is set to 4.8±0.3 mm, a suitable die is selected according to the outer diameter, and then an extrusion temperature of the jacket material is set to 135-168 degrees C. The die is assembled and the extrusion speed is adjusted to 25-30 r/min. After the outer jacket is formed around the fiber optic component and the electrical component, it is cooled in a hot water bath and a cold water bath. The temperature of the hot water bath is 45-60 degrees C., the temperature of the cold water bath is between 19-25 degrees C.

Pulling onto the plate completes the miniature photoelectric composite cable for high-definition video signal transmission.

The cross-sections of the fiber optic component and the electrical component of the miniature photoelectric composite cable for high-definition video signal transmission of the present embodiment are different, such as a flat and round composite structure design to cause the product of the present disclosure to have a small size, have exceptional bendability to satisfy 10,000 bending tests, and achieve the highest CMP certification of UL. The composite photoelectric structure uses a photoelectric conversion module to implement photoelectric conversion, thereby enhancing video signal transmission distance and transmission speed.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A miniature photoelectric composite cable for high-definition video signal transmission, comprising:
    a flat optical fiber component comprising a multi-core optical fiber, a strengthening layer, and a light jacket; and
    a round electrical component comprising a multi-core electrical cable, a cladding, and an electric jacket, the cladding covering outside the multi-core electrical cable; wherein:
    the optical fiber component and the electrical component are arranged side-by-side;
    the multi-core optical fiber is covered by the strengthening layer;
    the light jacket is formed around the strengthening layer by extruding, and the electric jacket is formed around the cladding by extruding.

2. The miniature photoelectric composite cable of claim 1, wherein the optical fiber has four cores, and the electrical cable has six cores, wherein the six cores of the electrical cable are twisted together.

3. The miniature photoelectric composite cable of claim 2, wherein the strengthening layer is made of high modulus aramid fiber.

4. The miniature photoelectric composite cable of claim 2, wherein the light jacket and the electric jacket are an integrally formed structure.

5. A miniature photoelectric composite cable for high-definition video signal transmission, the miniature photoelectric composite cable comprising:
    a fiber optic component; and
    an electrical component; wherein:
    a cross-sectional shape of the fiber optic component is different from a cross-sectional shape of the electrical component;
    the fiber optic component comprises an optical fiber, a light jacket, and a strengthening layer, the optical fiber is covered by the strengthening layer, and the light jacket is formed around the strengthening layer by extruding.

6. The miniature photoelectric composite cable of claim 5, wherein:
    the electrical component comprises an electrical cable and an electric jacket; and
    the light jacket and the electric jacket are integrally formed as an outer jacket.

7. The miniature photoelectric composite cable of claim 5, wherein:
    the fiber optic component is rectangular cuboid; and
    the electrical component is round; wherein
    the outer jacket comprises a ringed frame having an upper round portion and a lower rectangular portion.

8. The miniature photoelectric composite cable of claim 7, wherein:
    a connecting portion is formed between the light jacket and the electric jacket; and
    the connecting portion is rectangular; wherein
    a length of the connecting portion is less than a diameter of the electric jacket and a length of the light jacket.

9. The miniature photoelectric composite cable of claim 6, wherein:
    the strengthening layer is made of high modulus aramid.

10. The miniature photoelectric composite cable of claim 5, wherein:
    the fiber optic component comprises at least three optical fibers arranged in straight lines.

11. The miniature photoelectric composite cable of claim 6, wherein an outer diameter of the outer jacket is 4.8±0.3 mm.

* * * * *